United States Patent
Shalla

(10) Patent No.: US 9,286,179 B1
(45) Date of Patent: Mar. 15, 2016

(54) SERVICE TESTING FRAMEWORK

(71) Applicant: Amazon Technologies, Inc., Reno, NV (US)

(72) Inventor: Zachary Mohamed Shalla, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 112 days.

(21) Appl. No.: 14/031,945

(22) Filed: Sep. 19, 2013

(51) Int. Cl.
*G06F 11/00* (2006.01)
*G06F 11/26* (2006.01)

(52) U.S. Cl.
CPC ..................... *G06F 11/26* (2013.01)

(58) Field of Classification Search
CPC ...... G06F 11/26; G06F 11/36; G06F 11/3668
See application file for complete search history.

(56) References Cited

U.S. PATENT DOCUMENTS

| | | | |
|---|---|---|---|
| 5,938,732 A * | 8/1999 | Lim et al. | 709/229 |
| 2007/0162260 A1* | 7/2007 | Nordstrom | 702/186 |
| 2009/0210528 A1* | 8/2009 | Swildens et al. | 709/224 |
| 2009/0235172 A1* | 9/2009 | Gandhi et al. | 715/733 |
| 2010/0146486 A1* | 6/2010 | Mehta et al. | 717/126 |
| 2014/0195679 A1* | 7/2014 | Ikegami | 709/224 |

\* cited by examiner

*Primary Examiner* — Philip Guyton
(74) *Attorney, Agent, or Firm* — Thomas | Horstemeyer, LLP

(57) ABSTRACT

Disclosed are various embodiments for a service testing application. A service testing application executes test operations for services in a service-oriented architecture. If a test is failed, services that are dependent upon a failing service are reconfigured to instead call a corresponding service in a different installation of the service-oriented architecture. A dependency model of the service-oriented architecture may be searched to determine which service dependencies to reconfigure.

20 Claims, 5 Drawing Sheets

SERVICE TESTING FRAMEWORK

BACKGROUND

New installations of existing service-oriented architectures may be deployed. The services within the new installation may be deployed in stages, requiring regular configuration of references addressing service dependencies. Staged installation may be time consuming due to delayed installations. Additionally, frequent reconfigurations require additional testing and resources to ensure service stability and performance.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

New installations of service-oriented architectures are often deployed to address additional performance requirements or to expand the availability of services to new clients. For example, a compartmentalized installation of a service-oriented architecture may be deployed in a new data center region or availability zone to account for expansions in a distributed systems architecture. Having compartmentalized instances allows for increased redundancy, availability, and potentially improved network performance. Deploying a compartmentalized installation requires that each dependent service references other services within the same compartmentalized installation. As an example, services in an installation for a first region should only reference services in the first region, while services for a second region should only reference services in the second region.

Installation of the new installation may be performed in stages. A subset of services may initially be deployed for the new installation. If a service of the new installation references a service that has not yet been deployed to the new installation, it may instead reference the corresponding service of another installation. Once a newly deployed service is confirmed to be functioning correctly, additional services can be deployed to the new installation. As new services are iteratively deployed to the new installation, service references are updated to account for the newly deployed services. The staged installation is time consuming due to services being iteratively deployed, as opposed to all at once. The frequent reconfigurations also increase the amount of time required to perform the staged installation, and creates the risk of errors due to missed or incorrect reconfigurations.

All of the services of a new installation can be collectively deployed by implementing a services testing framework. A service testing application executes test operations for the services. If a service fails a test operation, services that call the failing service may be reconfigured to instead call a version of the service in another installation of the service-oriented architecture. This allows the services that are dependent upon the failing service to continue to perform correctly until the failing service can be remedied. The service testing application can also traverse a dependency model of the service-oriented architecture. Service references can be iteratively reconfigured and the test operations can be executed to determine services that cause dependent services to fail corresponding test operations. Additionally, the dependency model may be referenced to determine services to operate in the same installation, such as stateful services, to perform further reference reconfigurations. In the following discussion, a general description of the system and its components is provided, followed by a discussion of the operation of the same.

Figure 1:
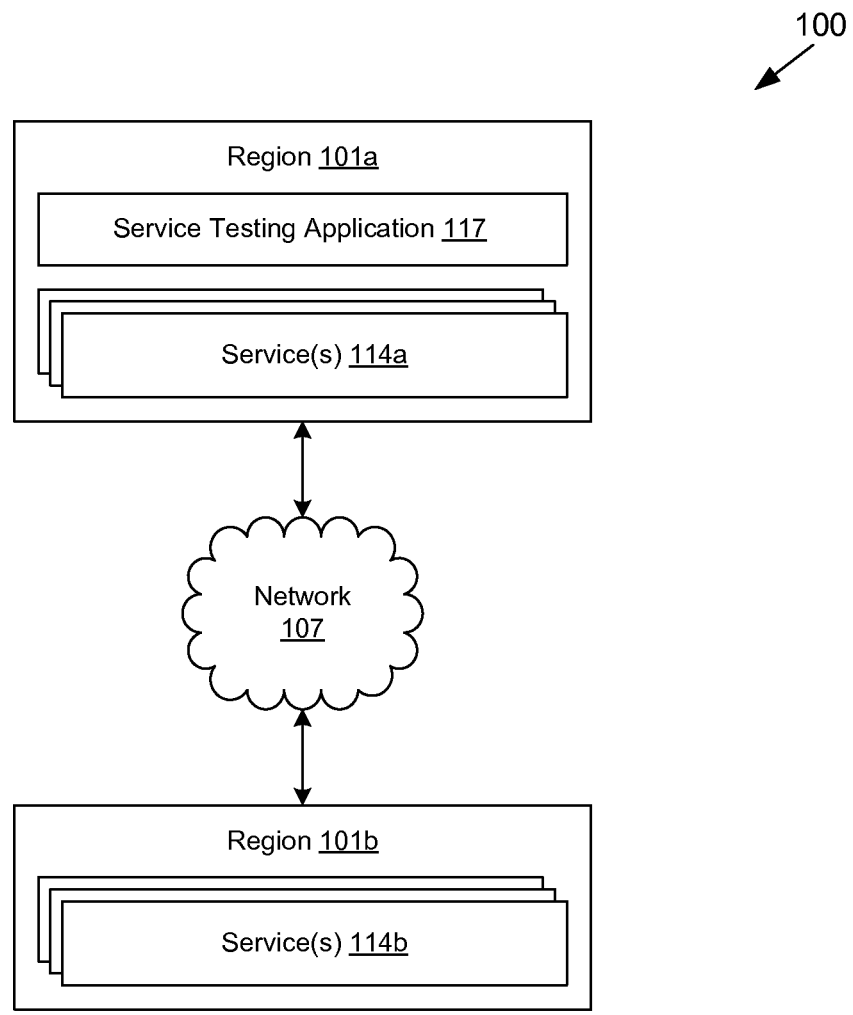
FIG. 1 is a drawing illustrating an example scenario of a system implementing a service test application in a service-oriented architecture according to various embodiments of the present disclosure.

With reference to FIG. 1, shown is a drawing illustrating one example scenario 100 of using a service testing application 117 in a service-oriented architecture according to an embodiment of the present disclosure. Data center regions 101a and 101b each implement a system according to a service-oriented architecture supported by respective services 114a and 114b. Each region 101a/b encapsulates a respective installation of the service-oriented architecture. The region 101b represents a preexisting installation of the service-oriented architecture, assumed to be functioning correctly. The region 101a represents a newly created region 101a, supporting a newly deployed installation of the service-oriented architecture using services 114a. The service testing application 117 tests the functionality of services 114a. If a service 114a fails a test, then the service testing application 117 reconfigures services 114a dependent upon the failing test 114a to instead call a service 114b executed in the region 101b.

Figure 2:
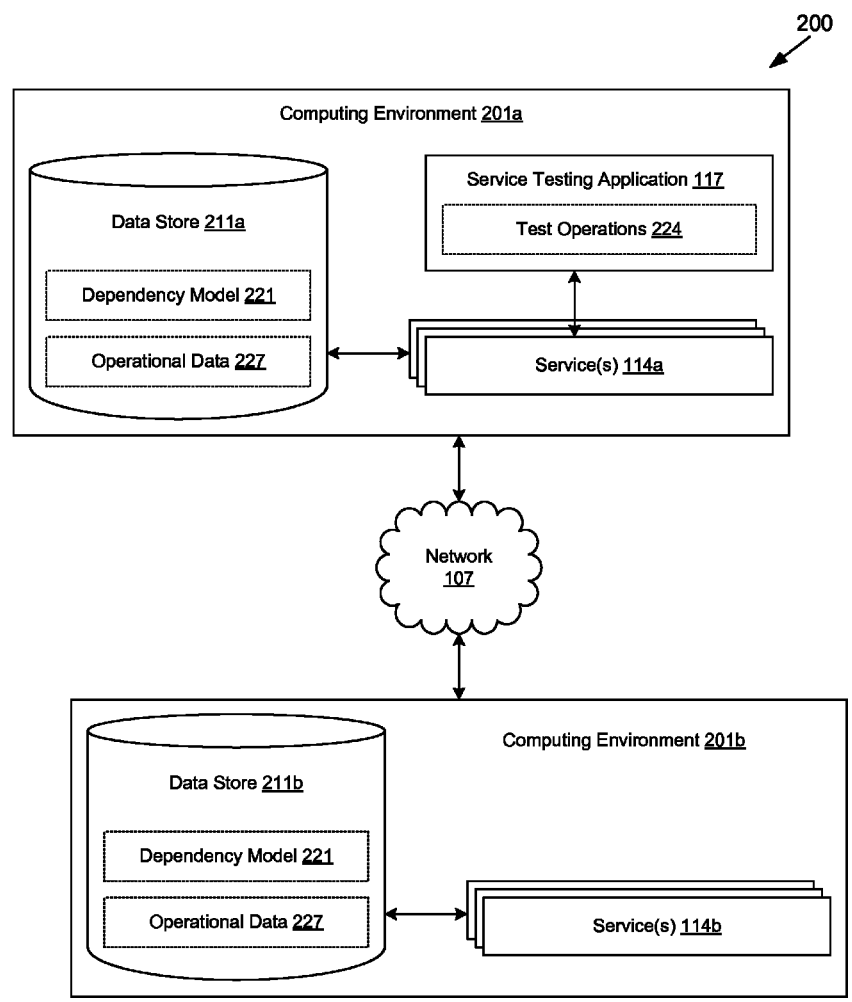
FIG. 2 is a drawing of a networked environment according to various embodiments of the present disclosure.

Turning now to FIG. 2, shown is a networked environment 200 according to various embodiments. The networked environment 200 includes a computing environment 201a, and a computing environment 201b, that are in data communication with each other via a network 107 (FIG. 1). The network 107 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environments 201a and 201b may each comprise, for example, a server computer or any other system providing computing capability. Alternatively, the computing environments 201a and 201b may each employ a plurality of computing devices that may be arranged, for example, in one or more server banks or computer banks or other arrangements. Such computing devices may be located in a single installation or may be distributed among many different geographical locations. For example, the computing environments 201a and 201b may each include a plurality of computing devices that together may comprise a hosted computing resource, a grid computing resource and/or any other distributed computing arrangement. In some cases, the computing environments 201a and 201b may each correspond to an elastic computing resource where the allotted capacity of processing, network, storage, or other computing-related resources may vary over time.

The computing environment 201a and computing environment 201b may correspond to various distinct compartmentalizations, divisions, or groupings. For example, the computing environment 201a and computing environment 201b may correspond to distinct data center regions, availability zones, geographical regions, internal networks, or other groupings as can be appreciated.

Various applications and/or other functionality may be executed in the computing environments 201a and 201b according to various embodiments. Also, various data is stored in data stores 211a and 211b that are accessible to the respective computing environment 201a or 201b. The data store 211a/b may be representative of a plurality of data stores 211a/b as can be appreciated. The data stored in the data store 211a/b, for example, is associated with the operation of the various applications and/or functional entities described below.

The components executed on the computing environment 201a, for example, include services 114a (FIG. 1), a service testing application 117 (FIG. 1) and other applications, services, processes, systems, engines, or functionality not discussed in detail herein. The components executed on the computing environment 201b, for example, include services 114b (FIG. 1) and other applications, services, processes, systems, engines, or functionality not discussed in detail herein.

The services 114a/b comprise functionality to implement one or more capabilities, as well as to enable access to the one or more capabilities. A service 114a/b may access the functionality of one or more other services 114a/b to implement its own functionality, thereby being dependent upon the one or more distinct services 114a/b. As a non-limiting example, a service 114a/b may be configured to process a customer order. This example service 114a/b may be dependent upon other services 114a/b that perform discrete subtasks of an order processing workflow. For example, individual services 114a/b may be respectively configured to read payment information from a data store 111a/b, decrypt payment information, process a payment, and write an order record to a data store 111a/b. Interactions between services 114a/b may be implemented according to a service-oriented architecture.

Such an architecture may create multiple interdependencies between the various services 114a/b executed in the respective computing environment 201a or computing environment 201b. Such interdependencies may be modeled, for example, in a dependency model 221. The service-oriented architecture of services 114a/b may be used to implement complex systems such as an electronic commerce system, web-hosting system, network application hosting system, or other systems as can be appreciated. The services 114a executed in the computing environment 201a are representative of an installation of a service-oriented architecture that is distinct from a corresponding installation executed in the computing environment 201b by services 114b. Services 114a and services 114b may share identical code or distinct code.

The service testing application 117 is executed to execute test operations 224. Test operations 224 include operations, functions, scripts, procedures, or other actions that test the operability of one or more services 114a/b. Test operations 224 may correspond to a variety of testing approaches, including unit testing, acceptance testing, integration testing, characterization testing, or other approaches.

Additionally, test operations 224 may correspond to various types of tests, including regression tests, verification tests, validation tests, code coverage tests, or other types of tests as can be appreciated. If a service 114a fails a respective test operation 224, the service testing application 117 is further executed to modify the configuration of a service 114a dependent upon the failing service 114a to instead call a corresponding service 114b executed in the computing environment 201b.

Although the service testing application 117 is depicted as being executed in the same computing environment 201a as services 114a, it is understood that the service testing application 117 may also be executed in the computing environment 201b. The service testing application 117 may also be executed in a computing environment distinct from computing environments 201a/b and in network communication with the computing environment 201a.

The data stored in the data store 211 includes, for example, a dependency model 221, operational data 227, and potentially other data. The dependency model 221 embodies interdependencies between respective services 114a/b. Operational data 227 comprises data that facilitates the operation of services 114a/b. This may include a variety of data that may be read, written, or otherwise accessed by a service 114a/b.

Next, a general description of the operation of the various components of the networked environment 200 is provided. To begin, an installation of a service-oriented architecture is executed in a computing environment 201b by services 114b. A distinct installation of the service-oriented architecture is executed in the computing environment 201a by services 114a. The computing environments 201a and 201b may correspond to distinct data center regions, data center availability zones, local networks, geographical regions, or other groupings of functionality as can be appreciated.

Next, the service testing application 117 executes test operations 224 to test the functionality of services 114a. In some embodiments, this may comprise a direct execution of the test operations 224 by the service testing application 117. In other embodiments, the service testing application 117 may query or otherwise access a separate test framework executed in the computing environment 201a to execute the test operations 224. Other approaches may also be used to execute test operations 224.

After executing the test operations 224, the service testing application 117 determines if a service 114a failed a corresponding test operation 224. In embodiments in which the service testing application 117 accesses a distinct test framework to execute the test operations 224, this may comprise parsing an output of the test framework, such as a console output, log file, or other output.

Various criteria may cause a service 114a to fail a test operation 224. For example, a service 114a may be configured incorrectly. Configuration errors may include referencing incorrect regional resources, incorrect service 114a dependency configurations, or other errors. As another example, a service 114a may access a data store 211a to perform its operations, and the data store 211a may lack a schema or requisite operational data 227. A service 114a may also fail due to code errors. For example, a service 114a may have been coded to test for connectivity to a predefined web site or network address to determine if the service 114a may access networked resources. The service 114a may fail a test operation 224 if the predefined web site or network address is inaccessible due to network 107 configurations, security policies, or other criteria of the computing environment 201a.

In some embodiments, if a failing service 114a is detected, the service testing application 117 reconfigures other services 114a that are dependent upon the failing service 114a. The service testing application 117 may determine or select the dependent services 114a by referencing a dependency model 221. After the reconfiguration, the dependent services 114a are instead configured to call a corresponding service 114b executed in the computing environment 201b. In some embodiments, this may comprise altering a Uniform Resource Locator (URL) reference to the failing service 114a to instead be directed to the corresponding service 114b. In other embodiments, this may comprise altering network 107 routing information, firewall or router settings, network address tables, or other data such that calls to the failing service 114a are instead directed to the corresponding service 114b. Other approaches may also be used to reconfigure services 114a dependent upon a failing service 114a.

In some embodiments, the service testing application 117 may detect multiple interdependent failing services 114a. For example, a first failing service 114a may be dependent upon a second failing service 114a. The second failing service 114a may also be dependent upon a third failing service 114a. In this situation, it is possible that the failure of the third failing service 114a contributed to the failure of the second failing service 114a. Similarly, the failure of the second failing service 114a may have contributed to the failure of the first failing service 114a.

In such an example, the service testing application 117 may traverse a dependency graph embodied in the dependency model 221 to determine a deepest failing service 114a. The deepest failing service 114a may comprise a failing service 114a that not dependent upon another failing service 114a. This may include a failing service 114a that is dependent upon passing services 114a, or a service 114a that is not dependent on other services 114a. This may comprise performing a tree traversal, graph search, or by another approach.

After determining the deepest failing service 114a, the service testing application 117 may first reconfigure those services 114a dependent upon the deepest failing service 114a. The service testing application 117 may then execute the test operations 224 again. The service testing application 117 may execute again the entirety of the test operations 224, or a subset of the test operations 224. For example, the service testing application 117 may execute those of the test operations 224 corresponding to previously failed services 114a, the reconfigured services 114a, or another subset of the test operations 224.

For example, using the example discussed above with respect to the first, second, and third failing services 114a, the third failing service 114a would be determined to be the deepest failing service 114a. The service testing application 117 would then reconfigure the second failing service 114a to call upon a service 114b corresponding to the third failing service 114a. The service testing application 117 would then execute the test operations 224 to determine if the second failing service 114a still failed the corresponding test operations 224. If the second failing service 114a now passes the test operations 224, it indicates that the failure of the third failing service 114a may have contributed to the failure of the second failing service 114a.

If the second failing service 114a still fails the test operations 224, the service testing application 117 may then repeat the reconfiguring discussed above with the next deepest failing service 114a. In this example, the service testing application 117 would then reconfigure the first failing service 114a to instead call a service 114b corresponding to the second failing service 114a. This process may repeat until the test operations 224 pass, until services 114a dependent upon the failing service 114a having the highest depth with respect to the dependency model 221 have been reconfigured, or until another condition has been satisfied.

Additionally, in some embodiments, reconfiguration of references to a failed service 114a may trigger the reconfiguration of references to additional services 114a. This may include embodiments in which the failed service 114a is a stateful service that accesses stateful data such as operational data 227 stored in a data store 211a. The additional services 114a that to be reconfigured may have failed or passed the test operations 224. These additional services 114a may be indicated in the dependency model 221 or another source.

For example, a failed service 114a may be configured to access operational data 227 stored in the data store 211a. A dependent service 114a may be reconfigured to call a service 114b corresponding to the failed service 114a. The dependent service 114a now calls upon a service 114b that instead accesses operational data 227 stored in the data store 211b. If a subset of services 114a still access the operational data 227 stored in the data store 211a, this may create data inconsistencies between the reconfigured dependent service 114a and the subset of services 114a.

For example, a failing service 114a may be configured to read operational data 227 from the data store 211a. A passing service 114a may be configured to write operational data 227 to the data store 211a. If the passing service 114a writes operational data 227 to the data store 211a, the operational data 227 will not be subsequently read by services 114a that have been reconfigured to instead call the service 114b corresponding to the failed service 114a.

In such an example, dependent services 114a that call upon a respective one of the subset of services 114a accessing the data store 211a would then be reconfigured to instead call the corresponding service 114b. This ensures that all stateful services 114a/b are accessing the data store 211b, thereby preventing data inconsistencies with their operations.

As another example, a cyclical dependency in the dependency model 221 may trigger reconfiguring of additional services 114a. For example, a first service 114a may depend on a second service 114a. The second service 114a may also depend on the first service 114a. If the first service 114a fails a test operation 224, then the second service 114a would be reconfigured to instead call a corresponding first service 114b. Dependent services 114a that call the second service 114a should also be reconfigured to instead call the corresponding second service 114b executed in the computing environment 201b. Other criteria may also necessitate the reconfiguring of additional services 114a.

Figure 3:
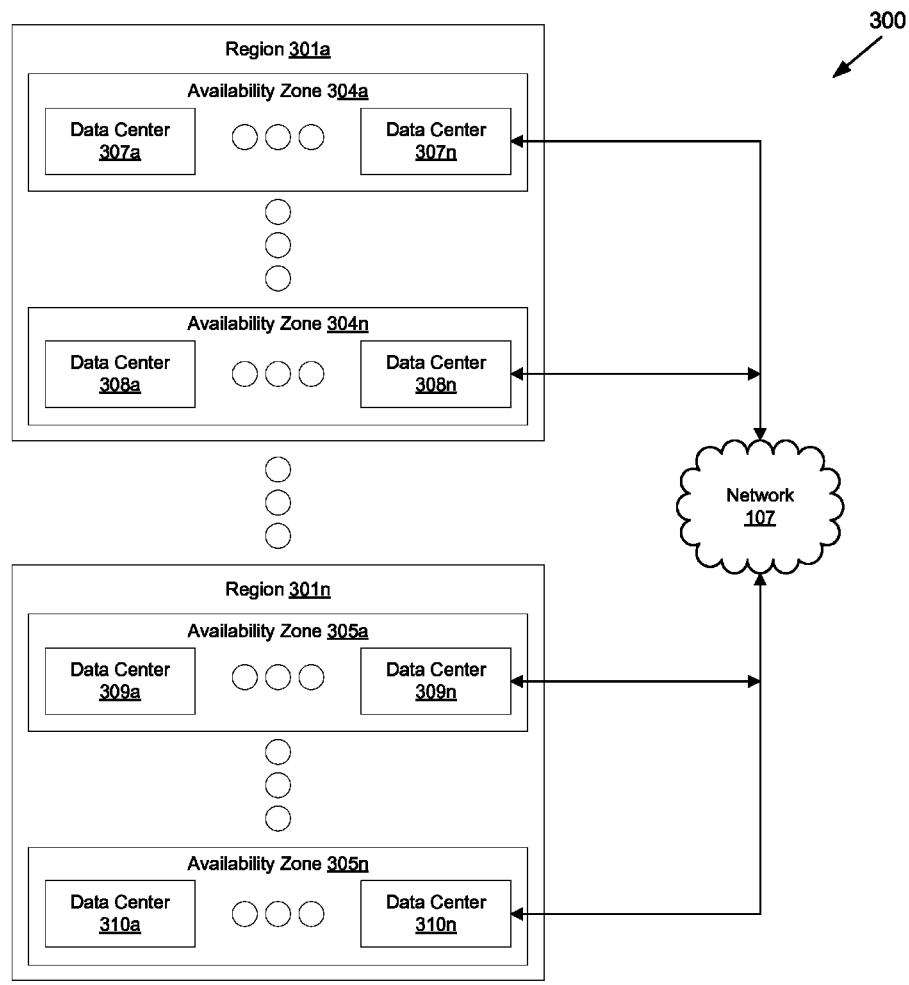
FIG. 3 is a pictorial diagram of region-level data center installation according to various embodiments of the present disclosure.

FIG. 3 represents a region-level view of an example data center architecture 300 according to various embodiments. Regions 301a-n are a plurality of logical groupings comprising a plurality of availability zones 304a-n and 305a-n. Regions 301a-n may be grouped as a function of geography, national boundaries, a logical or graphical topology, or some other approach. For example, regions 301a-n may be grouped by geographical areas of the United States, such as the southeast, the midwest, the northeast, or other geographical areas. Regions 301a-n may correspond to respective computing environments 201a (FIG. 2) or 201b (FIG. 2). Other approaches may also be used to define regions 301a-n.

Each region 301a-n comprises one or more availability zones 304a-n or 305a-n. Each of the availability zones 304a-n or 305a-n are logical groupings comprising one or more data centers 307a-n, 308a-n, 309a-n, and 310a-n. In some embodiments, the data centers 307a-n, 308a-n, 309a-n, and 310a-n comprise at least a portion of the functionality of respective computing environments 201a or 201b to implement services 114a/b (FIG. 1). Availability zones 304a-n or 305a-n are defined to be insulated from failures in other availability zones 304a-n or 305a-n, and to optimize latency costs associated with connectivity to other availability zones 304a-n or 305a-n in the same region 301a-n.

For example, distinct availability zones 304a-n or 305a-n may comprise distinct networks, power circuits, generators, or other components. Additionally, in some embodiments, a single data center 307a-n, 308a-n, 309a-n, or 310a-n may comprise multiple availability zones 304a-n or 305a-n. The regions 301a-n are in data communication with each other through a network 107 (FIG. 1).

Figure 4:
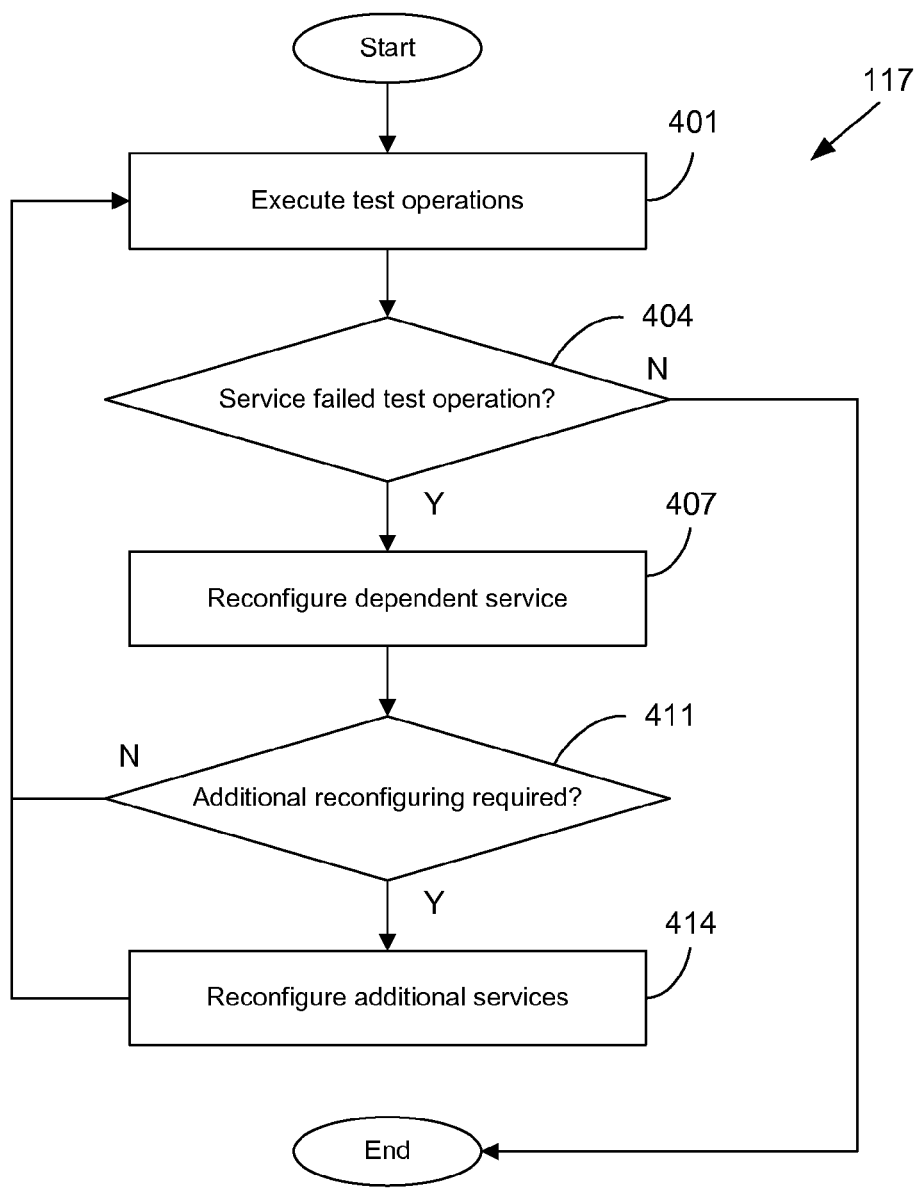
FIG. 4 is a flowchart illustrating one example of functionality implemented as portions of a service testing application executed in a computing environment in the networked environment of FIG. 2 according to various embodiments of the present disclosure.

Turning now to FIG. 4, shown is a flowchart that provides one example of the operation of a portion of the service testing application 117 according to various embodiments. It is understood that the flowchart of FIG. 4 provides merely an example of the many different types of functional arrangements that may be employed to implement the operation of the portion of the service testing application 117 as described herein. As an alternative, the flowchart of FIG. 4 may be viewed as depicting an example of elements of a method implemented in the computing environment 201a (FIG. 2) according to one or more embodiments.

Beginning with box 401, the service testing application 117 executes test operations 224 (FIG. 2) to test the functionality of services 114a (FIG. 1). In some embodiments, this may comprise a direct execution of the test operations 224 by the service testing application 117. In other embodiments, the service testing application 117 may query or otherwise access a separate test framework executed in the computing environment 201a to execute the test operations 224. Other approaches may also be used to execute test operations 224.

Next, in box 404, the service testing application 117 determines if one of the services 114a failed a corresponding executed test operation 224. In some embodiments, this may comprise comparing predicted output of a test operation 224 to actual output of the executed test operation 224. A difference between the expected and actual output may indicate a service 114a failed a test operation 224. In other embodiments, this may comprise determining if the totality of the test operations 224 or a quantity of test operations 224 meeting a threshold execute without error. In further embodiments, this may comprise determining if the totality of the code or a quantity of code meeting a threshold is executed during the execution of the test operations 224. In embodiments in which the service testing application 117 accesses a distinct test framework to execute the test operations 224, this may comprise parsing an output of the test framework, such as a console output, log file, or other output. Other approaches may also be used to determine if a service 114a failed an executed test operation 224.

If no services 114a failed a test operation 224, the process ends. Otherwise, the process advances to box 407 where a service 114a dependent on a failing service 114a is reconfigured. After being reconfigured, the dependent service 114a is instead dependent upon a service 114b (FIG. 1) executed in the computing environment 201b (FIG. 2) corresponding to the failing service 114a. In some embodiments, this may comprise altering a Uniform Resource Locator (URL) reference to the failing service 114a to instead be directed to the corresponding service 114b. In other embodiments, this may comprise altering network 107 routing information, firewall or router settings, network address tables, or other data such that calls to the failing service 114a are instead directed to the corresponding service 114b.

In some embodiments, multiple services 114a may fail a testing operation 224. In such an embodiment, the service testing application 117 reconfigures a service 114a that is dependent upon a failed service 114a that is deepest on a traversal of a dependency model 221 (FIG. 2). The depth of a failing service 114a may be determined according to a depth first search, breadth first search, tree traversal, or other graph traversal as can be appreciated. The service testing application 117 may also reconfigure all services 114a that dependent upon a failing service 114a. Other approaches may also be used to reconfigure services 114a dependent upon a failing service 114a.

Next, in box 411, the service testing application 117 determines if the reconfiguration of dependent services 114a discussed in box 407 requires additional services 114a to be reconfigured. This may include determining if the failing service 114a is included in a cyclical dependency, determining if the failing service 114a is a stateful service 114a, or other determinations. If no additional reconfiguring is required, the process returns to box 401 as will be described further. Otherwise, the process advances to box 414.

In box 414, the service testing application 117 reconfigures additional services 114a if determined to be necessary in box 411. For example, a failing service 114a may be included in a cyclical dependency of the dependency model 221. The service testing application 117 would then similarly reconfigure services 114a that are dependent on other services 114a included in the cyclical dependency. These reconfigured services 114a would then call services 114b corresponding to the services 114a of the cyclical dependency.

As another example, a failing service 114a may be a stateful service 114a, such as a service 114a that accesses operational data 227 (FIG. 2) in a data store 211a. The service testing application 117 would then reconfigure services 114a that are dependent upon stateful services 114a to instead call corresponding stateful services 114b. Other approaches may also be used to reconfigure additional services 114a. The process then returns to box 401. The service testing application 117 repeats the operations of boxes 401 through 414 until no services 114a fail a test operation 224 as determined in box 404.

Figure 5:
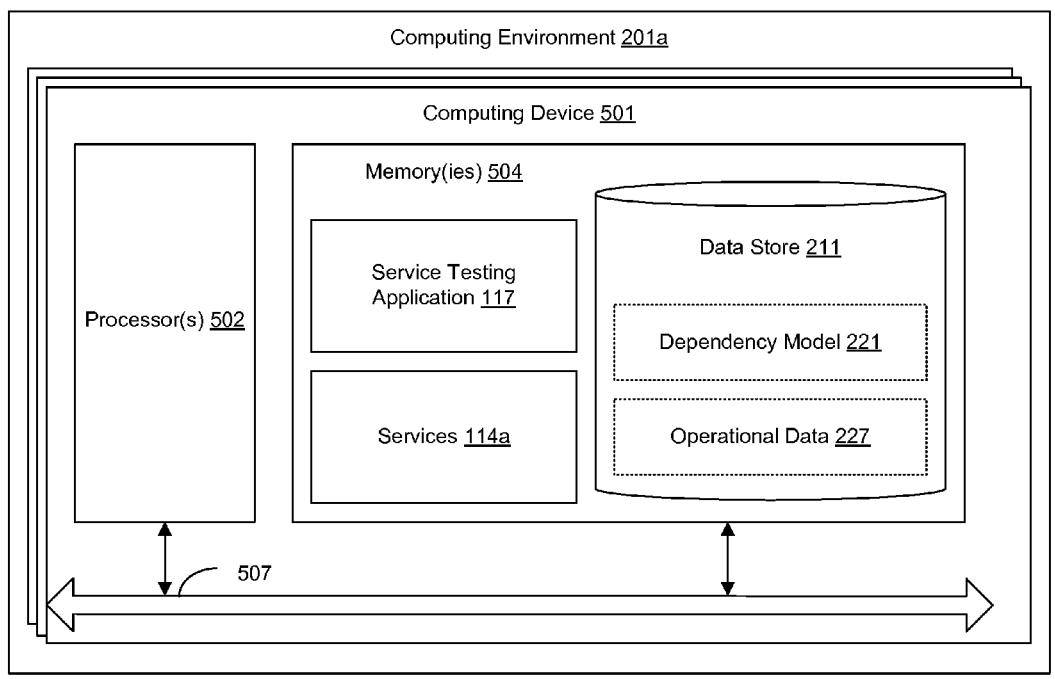
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 201a according to an embodiment of the present disclosure. The computing environment 201a includes one or more computing devices 501. Each computing device 501 includes at least one processor circuit, for example, having a processor 502 and a memory 504, both of which are coupled to a local interface 507. To this end, each computing device 501 may comprise, for example, at least one server computer or like device. The local interface 507 may comprise, for example, a data bus with an accompanying address/control bus or other bus structure as can be appreciated.

Stored in the memory 504 are both data and several components that are executable by the processor 502. In particular, stored in the memory 504 and executable by the processor 502 are services 114a, a service testing application 117, and potentially other applications. Also stored in the memory 504 may be a data store 211 storing a dependency model 221, operational data 227, and other data. In addition, an operating system may be stored in the memory 504 and executable by the processor 502.

It is understood that there may be other applications that are stored in the memory 504 and are executable by the processor 502 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 507 may be an appropriate network that facilitates communication between any two of the multiple processors 502, between any processor 502 and any of the memories 504, or between any two of the memories 504, etc. The local interface 507 may comprise additional systems designed to coordinate this communication, including, for example, performing load balancing. The processor 502 may be of electrical or of some other available construction.

Although the service testing application 117 and other various systems described herein may be embodied in software or code executed by general purpose hardware as discussed above, as an alternative the same may also be embodied in dedicated hardware or a combination of software/ general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an installation of portions of the service testing application 117. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 502 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the service testing application 117, that comprises software or code can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the service testing application 117, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 501, or in multiple computing devices in the same computing environment 201*a*. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of installations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein the program, when executed, causes the at least one computing device to at least:
   execute, according to a dependency model, a plurality of test operations corresponding to a plurality of services in a first installation of a service-oriented architecture;
   determine a first failing one of the plurality of services as a function of the plurality of test operations, the first failing one of the plurality of services being independent of a second failing one of the plurality of services;
   modify a reference of one of the plurality of services dependent on the first failing one of the plurality of services to be directed to a distinct instance of the first failing one of the plurality of services executed in a second installation of the service-oriented architecture;
   determine a first subset of the plurality of services to share a same installation as the first failing one of the plurality of services;
   individual ones of a second subset of the plurality of services having a respective URL (Uniform Resource Locator) reference directed to a respective one of the first subset of the plurality of services to be directed to a distinct instance of the respective one of the first subset of the plurality of services executed in the second installation of the service-oriented architecture;
   wherein the first installation of the service-oriented architecture is executed in a first data center region and the second installation of the service-oriented architecture is executed in a second data center region distinct from the first data center region.

2. The non-transitory computer-readable medium of claim 1, wherein the test operations comprise at least one of a regression test, a validation test, a verification test, or a coverage test.

3. The non-transitory computer-readable medium of claim 1, wherein the program further causes the at least one computing device to parse an output of a test framework, and the first failing one of the plurality of services is determined according to the parsing.

4. A system, comprising:
   at least one computing device configured to at least:
      execute a plurality of test operations associated with an operation of a plurality of services of a first installation of a service-oriented architecture;
      modify, responsive to a first one of the plurality of services corresponding to a failed one of the plurality of test operations, a configuration of a second one of the plurality of services calling the first one of the plurality of services to call a distinct instance of the first one of the plurality of services executed in a second installation of the service-oriented architecture;
      determine a first subset of the plurality of services to share a same installation as the first one of the plurality of services; and
      modify individual ones of a second subset of the plurality of services configured to call a respective one of the first subset of the plurality of services to call a distinct instance of the respective one of the first subset of the plurality of services executed in the second installation of the service-oriented architecture.

5. The system of claim 4, wherein the first installation of the service-oriented architecture is executed in a first data center region and the second installation of the service-oriented architecture is executed in a second data center region distinct from the first data center region.

6. The system of claim 4, wherein the failed one of the plurality of test operations is a first failed one of the plurality of test operations, and the at least one computing device is further configured to at least:
   determine, responsive to the first one of the plurality of services corresponding to the first failed one of the plurality of test operations, if a third one of the plurality of services corresponds to a second failed one of the plurality of test operations, the third one of the plurality of services being configured to call the first one of the plurality of services;
   modify, responsive to the third one of the plurality of services corresponding to the second failed one of the plurality of test operations, a configuration of the first one of the plurality of services to call a distinct instance of the third one of the plurality of services; and
   wherein the modifying the configuration of the second one of the plurality of services is further performed responsive to the third one of the plurality of services not corresponding to the second failed one of the plurality of test operations.

7. The system of claim 4, modifying the configuration of the second one of the plurality of services comprises modifying a Uniform Resource Locator (URL) reference directed to the first one of the plurality of services.

8. The system of claim 4, wherein the first subset of the plurality of services and the first one of the plurality of services are configured to access stateful data.

9. The system of claim 8, wherein the stateful data comprises data stored in a data store.

10. The system of claim 4, wherein the first subset of the plurality of services and the first one of the plurality of services correspond to a cyclical dependency.

11. The system of claim 4, wherein the test operations comprise at least one of a validation test, a verification test, or a coverage test.

12. The system of claim 4, wherein executing the plurality of test operations further comprises:

parsing an output of a test framework; and
determine whether the first one of the plurality of services corresponds to the failed one of the plurality of test operations as a function of the parsing.

13. A method, comprising:
executing, in a computing device, according to a dependency model, a plurality of test operations corresponding to a plurality of services of a first installation of a service-oriented architecture;
determining, in the computing device, a first failing one of the plurality of services as a function of the plurality of test operations, the first failing one of the plurality of services being independent of a second failing one of the plurality of services;
modifying, in the computing device, a configuration of one of the plurality of services dependent on the first failing one of the plurality of services to call a distinct instance of the first failing one of the plurality of services executed in a second installation of the service-oriented architecture;
executing, in the computing device, after modifying the configuration of the first one of the plurality of services, one of the plurality of test operations corresponding to the first one of the plurality of services; and
modifying, in the computing device, responsive to a failing of the one of the plurality of test operations, a configuration of a second one of the plurality of services dependent on the first one of the plurality of services to call a distinct instance of the first one of the plurality of services.

14. The method of claim 13, wherein the first one of the plurality of services is executed in a first region, and the distinct instance of the first one of the plurality of services is executed in a second region distinct from the first region.

15. The method of claim 13, further comprising
determining, in the computing device, a first subset of the plurality of services to share a same installation as the first failing one of the plurality of services;
modifying, in the computing device, individual ones of a second subset of the plurality of services configured to call a respective one of the first subset of the plurality of services to call a distinct instance of the respective one of the first subset of the plurality of services executed in the second installation of the service-oriented architecture; and
wherein the distinct instance of the respective one of the first subset of the plurality of services and the distinct instance of the first failing one of the plurality of services are implemented in a same distinct installation.

16. The method of claim 15, further comprising:
redefining, in the computing device, the first one of the plurality of services as the second one of the plurality of services; and
wherein the redefining and the executing the one of the plurality of test operations is repeatedly performed until a passing of the one of the plurality of test operations.

17. The method of claim 13, wherein the first installation of the service-oriented architecture is executed in a first data center availability zone and the second installation of the service-oriented architecture is executed in a second data center availability zone distinct from the first data center availability zone.

18. The method of claim 13, wherein the first failing one of the plurality of services and the distinct instance of the first failing one of the plurality of services comprise distinct code.

19. The method of claim 13, wherein the plurality of test operations comprise at least one of a validation test, a verification test, or a coverage test.

20. The method of claim 13, wherein determining the first failing one of the plurality of services comprises:
parsing, by the at least one computing device, an output of a test framework; and
determining the first failing one of the plurality of services as corresponding to at least one failed one of the plurality of test operations as a function of the parsing.

* * * * *